United States Patent
Elisha (10) Patent No.: US 9,584,364 B2
(45) Date of Patent: Feb. 28, 2017

(54) REPORTING PERFORMANCE CAPABILITIES OF A COMPUTER RESOURCE SERVICE

(71) Applicant: Amazon Technologies, Inc., Reno, NV (US)

(72) Inventor: Simon Jeremy Elisha, Sydney (AU)

(73) Assignee: Amazon Technologies, Inc., Reno, NV (US)

( * ) Notice: Subject to any disclaimer, the term of this patent is extended or adjusted under 35 U.S.C. 154(b) by 724 days.

(21) Appl. No.: 13/899,449

(22) Filed: May 21, 2013

(65) Prior Publication Data

US 2014/0351394 A1 Nov. 27, 2014

(51) Int. Cl.
| | |
|---|---|
| G06F 15/177 | (2006.01) |
| H04L 12/24 | (2006.01) |
| H04L 12/26 | (2006.01) |
| G06F 11/34 | (2006.01) |

(52) U.S. Cl.
CPC ...... H04L 41/0806 (2013.01); G06F 11/3409 (2013.01); G06F 11/3495 (2013.01); H04L 43/50 (2013.01); G06F 11/3428 (2013.01); G06F 2201/815 (2013.01)

(58) Field of Classification Search
None
See application file for complete search history.

(56) References Cited

U.S. PATENT DOCUMENTS

| | | | |
|---|---|---|---|
| 5,668,944 A | 9/1997 | Berry | |
| 7,694,189 B2 * | 4/2010 | Van Riel | G06F 9/45533 714/46 |
| 7,870,244 B2 | 1/2011 | Chong et al. | |
| 8,191,069 B2 | 5/2012 | Watanabe et al. | |
| 8,719,818 B2 | 5/2014 | Chen et al. | |
| 8,738,972 B1 | 5/2014 | Bakman et al. | |
| 9,021,474 B2 * | 4/2015 | Lefurgy | G06F 11/3409 718/1 |
| 2004/0143664 A1 | 7/2004 | Usa et al. | |
| 2009/0064158 A1 * | 3/2009 | Carter | G06F 11/3419 718/104 |
| 2009/0070771 A1 | 3/2009 | Yuyitung et al. | |
| 2009/0133018 A1 * | 5/2009 | Kaneki | G06F 11/3409 718/1 |
| 2009/0313620 A1 | 12/2009 | Sedukhin et al. | |
| 2010/0198960 A1 | 8/2010 | Kirschnick et al. | |
| 2010/0274890 A1 | 10/2010 | Patel et al. | |

(Continued)

OTHER PUBLICATIONS

Authorized Officer Lee, W. Young. International Search Report and Written Opinion dated Oct. 7, 2014 from International Application No. PCT/US2014/038745, pp. 1-10.

(Continued)

*Primary Examiner* — Thomas Dailey (74) *Attorney, Agent, or Firm* — Robert C. Kowert; Meyertons, Hood, Kivlin, Kowert & Goetzel, P.C.

(57) ABSTRACT

To assess the performance of a computer resource service in real time, a request can be sent to a resource monitoring tool to provide performance metrics for the computer resource service. To receive the desired metrics, the request can include one or more filters that specify the performance metrics desired. In response, the resource monitoring tool can provide the set of performance metrics that match the filters.

21 Claims, 7 Drawing Sheets

(56) References Cited

U.S. PATENT DOCUMENTS

| | | |
|---|---|---|
| 2011/0142053 A1 | 6/2011 | Van Der Merwe et al. |
| 2012/0042312 A1* | 2/2012 | Isci .................. G06F 1/3203 718/1 |
| 2012/0089726 A1* | 4/2012 | Doddavula ............ H04L 67/34 709/224 |
| 2012/0089980 A1 | 4/2012 | Sharp et al. |
| 2012/0137001 A1* | 5/2012 | Ferris .................... H04W 4/003 709/226 |
| 2012/0137003 A1* | 5/2012 | Ferris .................... H04W 4/003 709/226 |
| 2012/0240115 A1 | 9/2012 | Lefurgy et al. |
| 2012/0266166 A1 | 10/2012 | Farkas et al. |
| 2013/0019008 A1 | 1/2013 | Jorgenson et al. |
| 2013/0019242 A1 | 1/2013 | Chen et al. |
| 2013/0024729 A1 | 1/2013 | Salloum et al. |
| 2013/0218547 A1 | 8/2013 | Ostermeyer et al. |
| 2014/0149784 A1 | 5/2014 | Ngo et al. |

OTHER PUBLICATIONS

Kuhn, D. et al., "An Investigation of the Applicability of Design of Experiments to Software Testing," Proceedings of the 27th Annual IEEE Software Engineering Workshop, NASA Goddard, Dec. 5-6, 2002, pp. 91-95.

Christopoulos, V. et al., "Independent Component Analysis and Evolutionary Algorithms for Building Representative Benchmark Subsets," Proceedings of the International Symposium on Performance Analysis of Systems and Software (ISPASS) 2008, Austin TX, pp. 169-178.

U.S. Appl. No. 13/899,407, filed May 21, 2013, Simon Jeremy Elisha.

\* cited by examiner

REPORTING PERFORMANCE CAPABILITIES OF A COMPUTER RESOURCE SERVICE

CROSS-REFERENCE TO RELATED APPLICATIONS

This is related to U.S. patent application Ser. No. 13/899,407 filed May, 21, 2013, entitled DETERMINING AND MONITORING PERFORMANCE CAPABILITIES OF A COMPUTER RESOURCE SERVICE" to Simon Jeremy Elisha, the disclosure of which is incorporated by reference herein in its entirety.

BACKGROUND

Presently, network-accessible computing services sometimes referred to as cloud computing services or remote computing services, offer flexibly to customers in their computing choices. When customers instantiate new virtual machine instances within a computer resource service or migrate instances to the computer resource service, the customers may evaluate the resource characteristics of the instance executing in the computer resource service. This can include, among other possibilities, processor type and performance, memory size and performance, input/output capabilities, ephemeral storage size, and network capabilities.

Each instance type can have a different performance profile providing a degree of choice to the customer. However, it can be difficult to select between different instance types in terms of performance at a given time and location (e.g. a particular datacenter) due to various inconsistencies. For example, the instances may be hosted on differing underlying physical hardware, which may alter the actual performance of the instances (e.g. older hardware may perform differently than newer hardware). Also, instances, which are implemented in "busy" locations in the computer resource service (e.g. noisy neighbors), may provide reduced performance than in a less-subscribed area. Accordingly, it can be challenging to understand the performance profile of the instances in the computer resource service.

BRIEF DESCRIPTION OF THE DRAWINGS

Various features of the implementations can be more fully appreciated, as the same become better understood with reference to the following detailed description of the implementations when considered in connection with the accompanying figures, in which.

DETAILED DESCRIPTION

Implementations of the present disclosure are directed to systems and methods for determining and monitoring the performance of a computer resource service. To determine and monitor the performance of a computer resource service in real time, a resource monitoring tool can initiate test virtual machines on the computer systems of the computer resource service. The resource monitoring tool can then monitor various metrics that indicated the performance of the test virtual machines over time, such as processor performance, memory performance, input/output (I/O) performance, and network performance. The resource monitoring tool can store the monitored performance metrics, provide select performance metrics to users, and use the performance metrics to manage the computer resource service.

Accordingly, to accurately gauge the performance, the resource monitoring tool can select computer systems for testing that are representative of the computer resource service and the computer resources of the computer resource service. For example, if the computer systems are dispersed at various locations, the resource monitoring tool can select computer systems at the various locations so that the performance at each location can be monitored and compared. Likewise, for example, if the computer systems contain different computing resources (different types and ages of processors, memory, storage, etc.), the resource monitoring tool can select computer systems that represent the different computing resources. Accordingly, the resource monitoring tool can determine and compare the performance of differently located and configured computer systems.

In implementations, the resource monitoring tool can provide an interface (e.g. a Web Service API) that allows a user (or a software agent of a user) to request the performance metrics. The user, whether local to or remote from the resource monitoring tool, can utilize the performance metrics to evaluate the computing services provided by the computer resource service. For example, the user can, in real-time, evaluate and compare the performance of the computer systems of the computer resource service in different locations, the computer systems having different configurations, and how different configurations of instances perform on the computer systems. By evaluating the performance metrics, the user can select computer systems that deliver computing resources adequate for the user's needs, as well as select a configuration of the instances that best fits the user's needs. Accordingly, the performance metrics can be provided to a user to allow the user to make accurate decisions when selecting computing resources and configuration of instances in the computer resource service.

Figure 1A:
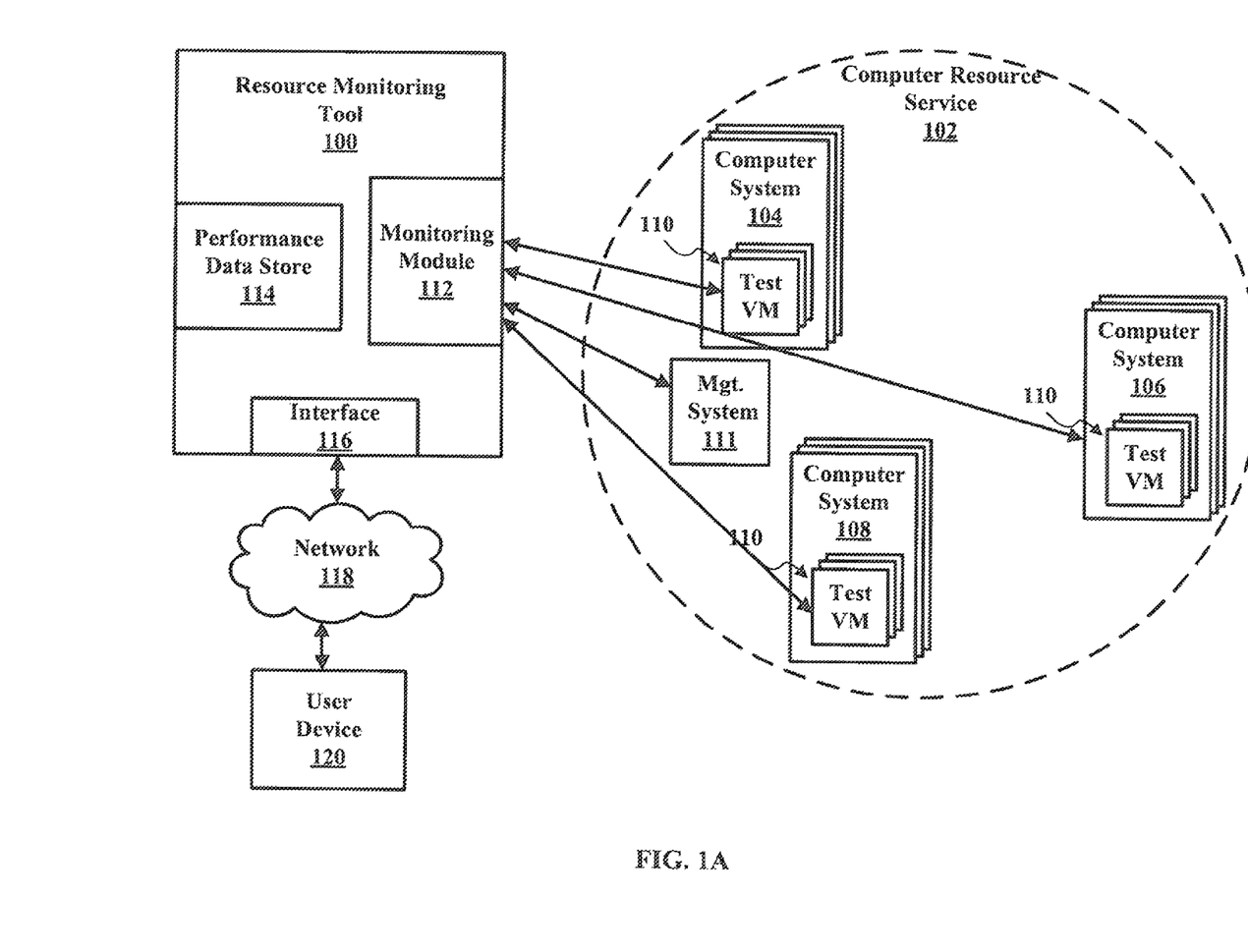
FIGS. 1A and 1B illustrate an example of an environment in which a resource monitoring tool can monitor a computer resource service, according to various implementations.
Figure 1B:
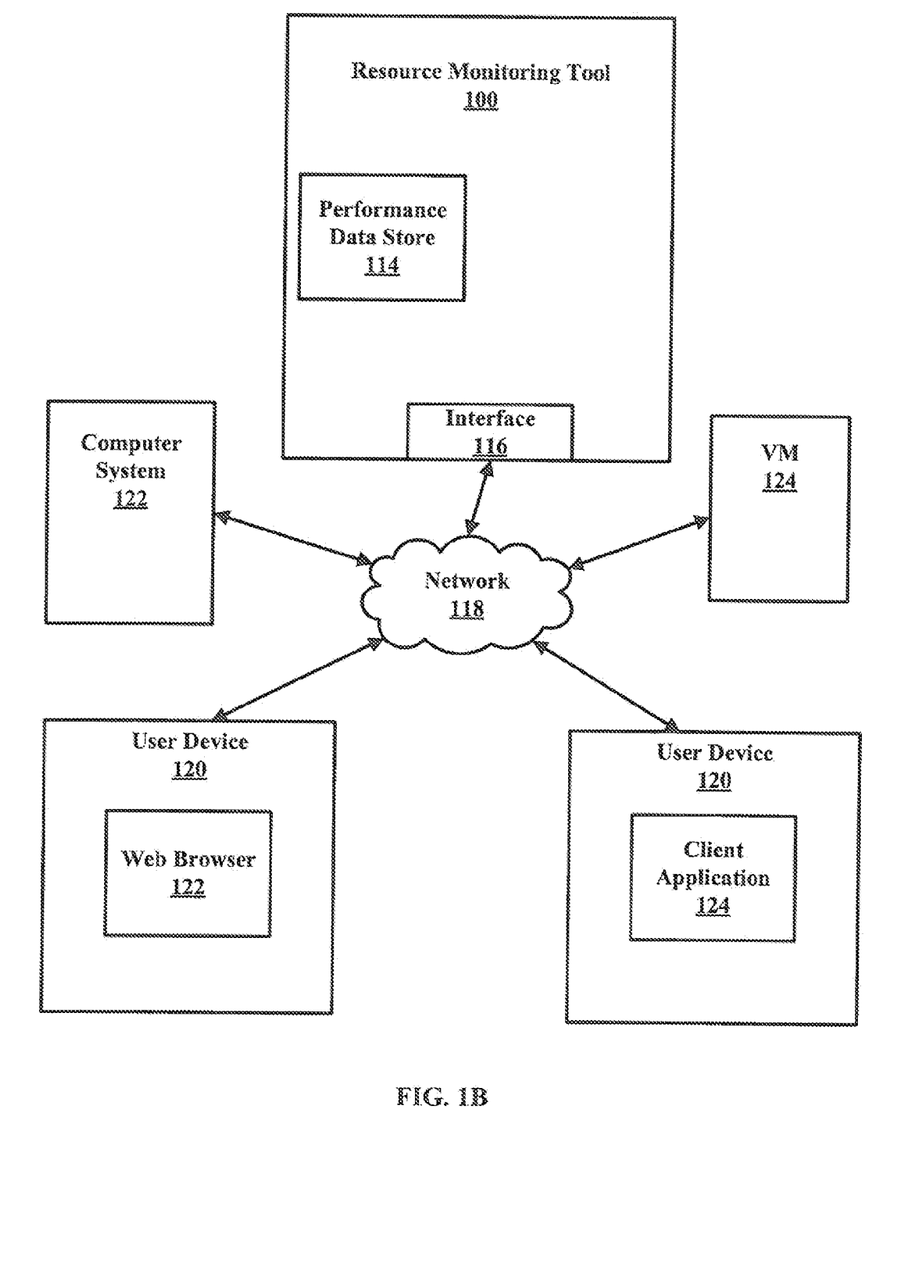

FIGS. 1A and 1B illustrate an example of a resource monitoring tool 100 which can determine and monitor the performance a computer resource service 102 and provide performance data to users, according to various implementations. While FIGS. 1A and 1B illustrate various components contained in the resource monitoring tool 100, FIGS. 1A and 1B illustrate one example of a monitoring tool and additional components can be added and existing components can be removed. Likewise, while FIGS. 1A and 1B illustrate various components contained in the computer resource service 102, FIGS. 1A and 1B illustrate one example of a computer resource service and additional component can be added and existing components can be removed.

In implementations, the resource monitoring tool 100 can be configured to determine and monitor the performance of the computer resource service 102. The computer resource service 102 can be configured to deliver computing resources to users over one or more networks as a service. For example, users may be able to provision computing resources on a pay-per-use basis, such as on an hourly basis. As illustrated in FIG. 1, the computer resource service 102 can include a number of computer systems such as a set of computer systems 104, a set of computer systems 106, and a set of computer systems 108. To provide computer resources as a service, the computer resource service 102 can be configured to execute one or more machine instances (MIs) on any of the computer systems 104, the computer systems 106, and the computer systems 108.

A MI can correspond to one or more of the computer systems 104, computer systems 106, or computer systems 108. Likewise, a MI can correspond to a virtual machine (VM) hosted by one or more of the computer systems 104, the computer systems 106, and the computer systems 108. A VM can be a virtualized computer system, or a software implementation of a computer system layered on top of any of the computer systems 104, computer systems 106, and computer systems 108. The VM's access to the underlying computer system can be controlled through a hypervisor or virtual machine monitor. The VMs can provide for multiple and/or different operating system environments to run concurrently on a single computer system.

In the computer resource service 102, each MI can be controlled by different users, who can have administrative access only to their own MIs and no access to the instances of other users. Multiple MIs can execute concurrently on a computer system including parallel processors, although multiple instances can appear to execute concurrently on a multithreaded computer system with fewer processors than instances. In some cases, different MIs, which execute on a computer system, are controlled by two or more different users, while in other cases all of the MIs are controlled by a single user.

The computer resource service 102 can also include one or more management systems 111. The one or more management systems 111 can be configured to control the operation and configuration of the computer resource service 102. The one or more management systems 111 can be configured to initiate execution of the MIs on the computer systems 104, the computer systems 106, and the computer systems 108, configure the MIs in the computer resource service 102, terminate the MIs executing on the computer systems 104, the computer systems 106, and the computer systems 108, and migrate existing MIs between the computer systems 104, the computer systems 106, and the computer systems 108. The one or more management systems 111 can also be configured to provide an interface to users requesting the computer services from the computer resource service 102. The one or more management systems 111 can be implemented as physical computer systems, such as one or more of the computer systems 104, the computer systems 106, and the computer systems 108. Likewise, the one or more management systems 111 can be implemented as one or more MIs executing in the computer resource service 102.

In implementations, the resource monitoring tool 100 can be configured to determine and monitor the performance of the computer resources provided by the computer resource service 102 by testing the operation of the computer systems 104, the computer systems 106, and the computer systems 108. In operation, the performance of the computer systems 104, the computer systems 106, and the computer systems 108 can be affected by the number of MIs executing on the computer systems, the usage of MIs executing on the computer systems, the physical hardware and software supporting the computer systems, and other similar factors. To test the operation of the computer systems 104, the computer systems 106, and the computer systems 108, the resource monitoring tool 100 can be configured to utilize one or more test VMs 110. The resource monitoring tool 100 can be configured to initiate the test VMs 110 on the computer systems 104, the computer systems 106, and the computer systems 108 and test the performance of the test VMs 110.

To accurately represent the computer resource service 102, the resource monitoring tool 100 can be configured to select the number and placement of the test VMs 110 based on the configuration of the computer resource service 102. In the computer resource service 102, the computer systems 104, the computer systems 106, and the computer systems 108 can be placed in different locations. The locations of the computer systems 104, the computer systems 106, and the computer systems 108 can include any granularity of separation within the computer resource service 102. For example, the locations can include specific computer systems in data center, different servers in a rack of servers, different data centers, different geographic location or regions, and the like. Accordingly, in order to test the different locations, the resource monitoring tool 100 can be configured to select a number of computer systems to test from each location of the computer systems 104, the computer systems 106, and the computer systems 108.

Likewise, the computer systems at the different location can offer different computer resources. For example, the computer systems 104, the computer systems 106, and the computer systems 108 can include different configurations of hardware resources and/or software resources. Also, the computer systems 104, the computer systems 106, and the computer systems 108 can include hardware resources and/or software resources of different ages. For example, one or more of the computer systems 104, the computer systems 106, and the computer systems 108 can include older computer systems, which typically employ older hardware resources and software resources and provide reduced computing resources. Accordingly, the resource monitoring tool 100 can be configured to select a number of computer systems, from each location, that represents different configurations and ages.

When selecting the number of computer systems, the resource monitoring tool 100 can select sufficient numbers of computer systems from each of the different locations, different configuration, different ages, and the like to accurately represent the computer systems. That is, the resource monitoring tool 100 can be configured to select a number of computer systems from each of the different locations, different configuration, different ages, and the like that is statistically significant. For example, for a particular location, configuration, or age, the resource monitoring tool 100 can select a number of computer systems that is statistically representative of all the computer systems of the particular location, configuration, or age. This number of computer systems can be a percentage of the total number of computer systems of the particular location, configuration, or age (e.g., 10%, 5%, 1%, etc.). When selecting the computer systems from a particular location, configuration, or age, the resource monitoring tool 100 can randomly select computer systems from the particular location, configuration, or age.

In implementation, when testing the computer resources, the resource monitoring tool 100 can be configured to utilize different configurations of the test VMs 110. In particular, the resource monitoring tool 100 can select test VMs 110 that utilize different amounts of the computer resources offered by the computer resource service 102. The resource monitoring tool 100 can be configured to select preconfigured test VMs 110 that are offered by the computer resource service 102. Likewise, the resource monitoring tool 100 can be configured to determine various configurations of the test VMs 110 that represent different levels of computer resources.

In implementations, the resource monitoring tool 100 can be configured as a software program that is capable of being stored on and executed by a computer system, whether part of the computer resource service 102 or external to the computer resource service 102. Likewise, the resource monitoring tool 100 can be configured as a software module that is part of other application programs. In any example, the resource monitoring tool 100 can be written in a variety of programming languages, such as JAVA, C++, Python code, Visual Basic, HTML, XML, and the like to accommodate a variety of operating systems, computer system architectures, etc. As illustrated in FIG. 1, the resource monitoring tool 100 can include a monitoring module 112, a performance data store 114, and an interface 116. While illustrated as being part of a single application program, any one of the components of the resource monitoring tool 100 can be implemented as a separate software programs or modules.

In implementations, the monitoring module 112 can be configured to test the performance of the test VMs 110 and monitor performance metrics of the test VMs 110. As the test VMs 110 execute in the computer resource service 102, the monitoring module 112 can be configured test the performance of the test VMs 110. In particular, the monitoring module 112 can be configured to perform one or more benchmarking tests that measure the performance of the test VMs 110. The benchmarking tests can include any types of conventional tests that measure processor performance (e.g., score based on software execution, instruction execution, etc.), memory performance (e.g., latency, read speed, write speed, etc.), input/output (I/O) performance (e.g., I/O per second, I/O bandwidth, etc.), network performance (e.g., network bandwidth, network packets per second, etc.), and the like.

From the benchmarking tests, the monitoring module 112 can be configured to collect performance metrics. The performance metrics include the results of the benchmarking tests. Once collected, the resource monitoring tool 100 can be configured to store the performance metrics in the performance data store 114. The performance data store 114 can be implemented as one or more data structures that can store the performance metrics. The performance data store 114 can also store details of computer resource service 102, details of the computer systems 104, the computer systems 106, and the computer systems 108, details of the test VMs 110, details of the performance tests, and the like.

The performance data store 114 can be configured to store the performance metrics and the other data in a manner that allows relevant information to be linked and correlated. For example, for a particular set of performance metrics, the performance data store 114 can associate the details of the particular test VMs 110 that produced the particular set of performance metrics, details of the particular computer systems on which the particular test VMs 110 executed, the locations of the particular computer systems, details of the performance test that were performed on the particular test VMs 110, and the like.

In implementations, the resource monitoring tool 100 can be configured to utilize a monitoring agent to assist in testing and monitoring the test VMs 110. The monitoring agent can be implemented as a software program that is configured to execute on the test VMs 110 and perform one or more of the performance test. To collect the performance metrics, the monitoring agent can be configured to transmit the performance to the resource monitoring tool 100. The monitoring agent can transmit the performance metrics in real-time, at periodic intervals, on demand, and combination thereof. Likewise, the resource monitoring tool 100, for example via the monitoring module 112, can be configured to communicate with the monitoring agent and retrieve the performance metrics from the monitoring agent. The resource monitoring tool 100 can retrieve the performance metrics in real-time, at periodic intervals, on demand, and combination thereof.

In addition to collecting the performance metrics, the resource monitoring tool 100 can be configured to perform statistical analysis on the performance metrics. The resource monitoring tool 100 can perform the statistical analysis in order to analyze and compare the performance of the computer systems, the performance of the different configurations of the test VMs, and combination thereof. The statistical analysis can be any type of procedure that produces statistical values that aid in analyzing and comparing the performance of the computer systems, the performance of the different configurations of the test VMs, and combination thereof; such as median, mean, standard deviation, statistical ranking based on the relationship, statistical modeling, and the like. Once determined, the resource monitoring tool 100 can store the statistical values in the performance data store 114.

For example, the resource monitoring tool 100 can compare the performance metrics of a particular configuration of a test VM operating on a computer system over time. For instance, the resource monitoring tool 100 can determine the median, mean, and standard deviation of the performance metrics collected over time to evaluate the performance over time. Additionally, for instance, the resource monitoring tool 100 can determine a particular time that the performance metrics fall within a certain percentage relative to performance metrics at other times.

Likewise, for example, the resource monitoring tool 100 can determine statistical values for the performance metrics of different computing systems hosting a particular configuration of a test VM, whether in the same location, different location, or both. In this example, the resource monitoring tool 100 can compare the statistical values to determine the performance of computing systems relative to each other. Additionally, the resource monitoring tool 100 can determine statistical values for the performance metrics of different configurations of test virtual machines, whether executing on the same computer systems, different computer systems, or both. The resource monitoring tool 100 can compare the statistical values to determine the performance of different configurations of the test virtual machines relative to each other.

The resource monitoring tool 100 can also include the interface 116 to allow the user device 120 to communicate, via one or more networks 118, with the resource monitoring tool 100 and access the performance metrics. The user device 120 can include computer devices, such as desktops, laptops, servers, etc., or mobile devices, such as smart telephones, tablet computers, cellular telephones, personal digital assistants, etc. The user device 120 can include hardware resources (e.g., processors, memory, storage, network interface, I/O devices, etc.) and software resource (e.g., operating systems, application programs, mobile apps, etc.) that are found in conventional computer devices.

In implementations, the interface 116 can be any type of interface that allows a user to communicate, locally and remotely, with the resource monitoring tool 100. For example, the interface 116 can include a graphical user interface ("GUI") or command-line interface that allows a user to interact with the resource monitoring tool via the computer system on which the resource monitoring tool 100 is executing. Also, for example, the interface 116 can include a web-based interface that allows the user device 120 to remotely communicate with the resource monitoring tool 100 using a web-based application, such as a web browser. Likewise, for example, the interface 116 can include an application programming interface ("API") that allows applications on the user device 120 to communicate with the resource monitoring tool 100. In some implementation, the interface can be a Web Service API.

In implementations, a user of the user device 120 can desire to evaluate the performance of the computer resource service 102. For instance, the user can desire to determine the best location, computer systems, and configuration of MIs to be initiated in the computer resource service. To achieve this, the user device 120 can send a request, to the resource monitoring tool 100, to provide a set of the performance metrics. In response, the resource monitoring tool 100 can be configured to search the performance data store 114 and retrieve a set of the performance metrics that match the request of the user device 120. The resource monitoring tool 100 can be configured to send the set of performance metrics to the user device 120.

To provide meaningful information to the user device 120, the resource monitoring tool 100 can be configured to utilize filters when determining the set of performance metrics to retrieve for the user device 120. In particular, the resource monitoring tool 100 can utilize the filters to determine the particular performance metrics to retrieve for the user device. The filters can include one or more parameters that specify which of the performance metrics is desired by the user device 120.

For example, the filters can include one or more parameters related to the computer systems in the computer resource service 102. These can include an identification of a particular locations or regions where the computer systems are located, an identification of a particular configurations of the computer systems, and the like. Additionally, for example, the filters can include one or more parameters related to the test VMs 110 or the tests performed on the test VMs 110. These parameters can include an identification of a particular type or configuration of a test VMs 110, an identification of a location or region the test VMs 110 where initiated, an identification of a benchmarking test, a date or time range that tests were performed, and the like. Also, for example, the filters can include one or more parameters around the performance metrics themselves. These parameters can include a particular type of performance metric (e.g., processor performance, memory performance, I/O performance, network performance, etc.), a particular value for the performance metrics, particular statistics of the performance metrics (e.g., average values, median values, certain percentile, etc.), and the like.

FIG. 1B illustrates an example of the user device 120 communicating with the resource monitoring tool 100. While FIG. 1B illustrates various components contained in the user device 120, FIG. 1B illustrates one example of a user device and additional components can be added and existing components can be removed.

As illustrated in FIG. 1B, the user device 120 can include a web browser 122 for communicating with the resource monitoring tool 100. In this example, the interface 116 can be configured to communicate with the web browser 122 utilizing web-based protocols (e.g., hypertext markup language (HTML)). The interface 116 can include one or more web pages, one or more web applications, and the like that allow the user device 120 to request a set of performance metrics. The interface 116 can include one or more web pages, one or more web applications, and the like that also allow the user device 120 to provide or select one or more of the filters. Likewise, the interface 116 can include one or more web pages, one or more web applications, and the like that allow the resource monitoring tool 100 to provide the set of performance metrics to the user device 120.

Additionally, as illustrated in FIG. 1B, the user device 120 can include a client application 124 for requesting performance metrics. The interface 116 can include an API that allows the client application 124 to communicate with the resource monitoring tool 100. The client application 124 and the interface 116 can communicate using any appropriate type of messaging, such as by using messages in extensible markup language (XML) format and exchanged using an appropriate protocol such as SOAP (derived from the "Simple Object Access Protocol"). The processes provided by the resource monitoring tool 100, via the interface 116, can be written in any appropriate language, such as the Web Services Description Language (WSDL). The client application 124 can communicate with the resource monitoring tool 100 under the control of a user. Likewise, the client application 124 can automatically communicate with the resource monitoring tool 100.

In implementations, other types of computer systems and MIs can communicate with the resource monitoring tool 100, via the interface 116, to acquire the performance metrics. A computer system 122 can communicate with the resource monitoring tool 100 via the interface 116. For example, the computer system 122 can be the computer system of a third-party that is not utilizing the computer resource service 102, but desires to monitor the performance of the computer resource service 102. For instance, the third-party can be a service that provides performance information and statistics for the computer resource service 102. The computer system 122 can be configured to communicate with the resource monitoring tool 100, via the interface 116, under the control of an operator. Likewise, the computer system 122 can be configured to automatically communicate with the resource monitoring tool 100, via the interface 116, to acquire the performance metrics.

Additionally, for example, a VM 124 can be configured to communicate with the resource monitoring tool 100, via the interface 116. For example, The VM 124 can acquire the performance metrics in order to determine computer resources hosting itself or other VMs. The VM 124 can be hosted by the computer resource service 102, any other type of computer resource service, or any type of computer systems. The VM 124 can be configured to communicate with the resource monitoring tool 100, via the interface 116, under the control of an operator. Likewise, the VM 124 can be configured to automatically communicate with the resource monitoring tool 100, via the interface 116, to acquire the performance metrics.

Figure 2:
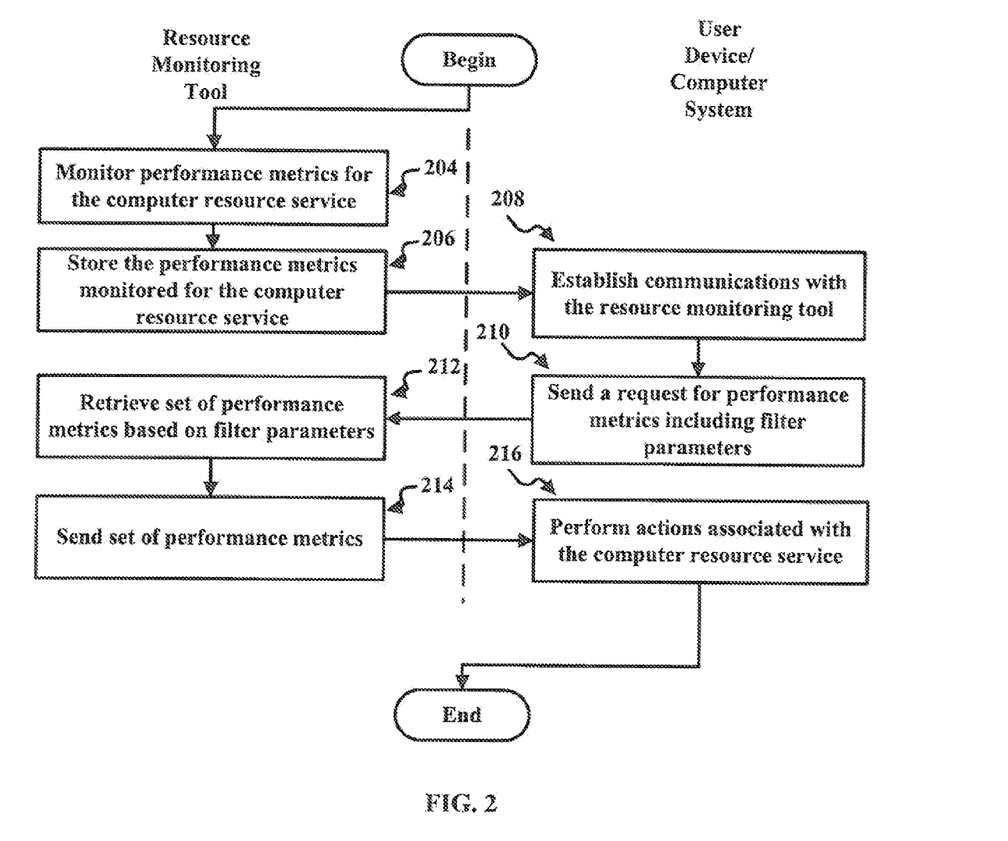
FIG. 2 illustrates an example of a process for reporting performance of a computer resource service, according to various implementations.

FIG. 2 illustrates a process 200 for reporting the performance of a computer resource service, according to various implementations. In the process 200, the illustrated stages are examples and any of the illustrated stages can be removed, additional stages can be added, and the order of the illustrated stages can be changed. Additionally, while the process 200 is described as being performed by the resource monitoring tool 100 and the user device 120, any of the stages of the process 200 can be performed by either the resource monitoring tool 100, the user device 120, or any hardware or software component.

In 204, the resource monitoring tool 100 can monitor performance metrics for the computer resource service 102. Below is a general description of monitoring the performance metrics by the resource monitoring tool 100. A detailed description of the process can be found in related application U.S. patent application Ser. No. 13/899,407 filed May, 21, 2013, entitled DETERMINING AND MONITORING PERFORMANCE CAPABILITIES OF A COMPUER RESOURCE SERVICE" to Simon Jeremy Elisha, the disclosure of which is incorporated by reference herein in its entirety.

In general, the resource monitoring tool 100 can determine identification information for the computing systems 104, computer systems 106, and computer systems 108, such as the location of the computer systems, the names of the computer systems, the network addresses of the computer systems, access information for the computing systems, and the like. Additionally, the resource monitoring tool 100 can determine details of the computing systems 104, computer systems 106, and computer systems 108, such as hardware and software components of the computing systems. Additionally, the locations and configurations of the computer systems can also be preprogrammed in the resource monitoring tool 100.

Then, the resource monitoring tool 100 can determine a set of the computer systems that is representative of the location distributions of the computing systems and the computing resources of the computing systems. That is, the resource monitoring tool 100 can select computer systems that represent different locations of the computing systems and different computer resource configurations of the computing systems. The number of computer systems selected can be statistically significant so that an accurate measure of the performance can be determined.

For example, if the computer systems 104 are located at a first location and the computer systems 106 are located at a second location, the resource monitoring tool 100 can select a number of the computer systems 104 and a number of the computer systems 106 that are representative of each location and yield reliable performance metrics, e.g. 5% of the computer systems 104 and 5% of the computer systems 106. Likewise, in this example, the computer systems 104 can have two computer resource configurations: e.g. a first group of computer systems 104 have the same processors, memory, and network bandwidth and a second group of the computer systems 104 have the same processor, memory, and network bandwidth but different from the first group. When selecting computer systems from the computer systems 104, the resource monitoring tool 100 can select a statistically significant number from both the first group and the second group.

Next, the resource monitoring tool 100 can initiate test VMs on the set of computer systems. The resource monitoring tool 100 can select the same configuration for each of the test VMs so that the performance can be compared and correlated between the computer systems. For example, the resource monitoring tool 100 can select a test VM 100 that is configured to offer particular computer resources (e.g., processing power, memory, I/O resources, network bandwidth, etc.). The resource monitoring tool 100 can configure the test VMs 110. Likewise, the resource monitoring tool 100 can select a preconfigured virtual machine to initiate on the computer systems.

Once initiated, the resource monitoring tool 100 can monitor performance metrics of the test VMs on the set of computer systems. The resource monitoring tool 100 can remotely monitor the performance metrics via a network connection. The resource monitoring tool 100 and/or the monitoring agent can run various benchmarking test on the test VMs 110. The benchmarking tests can include any types of conventional tests that measure processor performance (e.g., score based on software execution, instruction execution, etc.), memory performance (e.g., latency, read speed, write speed, etc.), input/output (I/O) performance (e.g., I/O per second, I/O bandwidth, etc.), network performance (e.g., network bandwidth, network packets per second, etc.), and the like. The resource monitoring tool 100 can monitor the performance metrics over time.

In 206, the resource monitoring tool 100 can store the performance metrics monitored for the computer resource service 102. The resource monitoring tool 100 can store the performance metrics in one or more data structures, such as the performance data store 114. The resource monitoring tool 100 can store the performance metrics as well as other information. The other information can include, for example, the information collected in 204.

During the monitoring of the performance by the resource monitoring tool 100, a user of the user device 120 can desire to determine the performance of the computer resource service 102. Accordingly, in 208, the user device 120 can establish communications with the resource monitoring tool 100. The user device 120 can establish communications with resource monitoring tool 100 via the network 118. For example, the user device 120 can utilize a web browser 122 to communicate with the resource monitoring tool 100. Likewise, for example, the user device 120 can utilize a client application 124 to communicate with the resource monitoring tool 100.

In 210, the user device 120 can send a request, to the resource monitoring tool 100, for a set of the performance metrics. To acquire the set of performance metrics, the user device 120 can include filters in the request for the set of performance metrics. The filters can include one or more parameters that specify which of the performance metrics is desired by the user device 120.

For example, the filters can include one or more parameters related to the computer systems in the computer resource service 102. These can include an identification of a particular locations or regions where the computer systems are located, an identification of a particular configurations of the computer systems, and the like. Additionally, for example, the filters can include one or more parameters related to the test VMs 110 or the tests performed on the test VMs 110. These parameters can include an identification of a particular type or configuration of a test VMs 110, an identification of a location or region the test VMs 110 where initiated, an identification of a benchmarking test, a date or time range that tests were performed, and the like. Also, for example, the filters can include one or more parameters around the performance metrics themselves. These parameters can include a particular type of performance metric (e.g., processor performance, memory performance, I/O performance, network performance, etc.), a particular value for the performance metrics, particular statistics of the performance metrics (e.g., average values, median values, certain percentile, etc.), and the like.

In 212, in response to receiving the request, the resource monitoring tool 100 can retrieve the set of performance metrics. The resource monitoring tool 100 can search the performance data store 114 to identify the performance metrics that meet the filters in the request. From the search, the resource monitoring tool 100 can retrieve the set of performance metrics that meet the filters in the request.

For example, if the request includes filters that specified a particular location in the computer resource service 102 and a particular date range, the resource monitoring tool 100 can search the performance data store 114 and retrieve all the performance metrics that were monitored in that particular location during that date range. In another example, if the request includes filters that specified a particular location, a particular benchmark test, and a particular date range, the resource monitoring tool 100 can search the performance data store 114 and retrieve all the performance metrics that were monitored in that particular location, for the particular benchmark test, during that date range. In another example, if the request includes filters that specified a particular configuration of a test VM 100, the resource monitoring tool 100 can search the performance data store 114 and retrieve all the performance metrics that were monitored for that particular configuration of the test VM 110.

In 214, the resource monitoring tool 100 can send the set of performance metrics to the user device 120. The resource monitoring tool 100 can send the set of performance metrics via the network 118. For example, if the user device 120 is communicating via the web browser 122, the resource monitoring tool 100 can provide the set of performance metrics in a web page to be used by the web browser 122. Likewise, for example, if the user device 120 is communicating via the client application 124, the resource monitoring tool 100 can provide the set of performance metrics in data structure with a format that is accessible by the client application 124.

In 216, the user device 102 can perform one or more actions based on the set of performance metrics. For example, the user device 102 can output the set of performance metrics. For example, the user device 102 can display the set of performance metrics on an I/O device (e.g., display) of the user device 102.

Likewise, the user device 120 can utilize the performance metrics to assist in any process that requires determination of the performance of the computer resources of the computer resource service 102. For example, performance metrics can be utilized to determine a particular computer system or location of computer systems on which to initiate new MIs. For instance, if a particular computer system or particular location of computer systems shows good performance metrics for the test VMs, the user device 120 can be initiate (or request initiation) of new MIs on the particular computer system or in a the particular location. Likewise, for example, if the user device receives a set of performance metrics for different configurations of test VMs, the user device 120 can utilize the set of performance metrics in selecting a configuration for MIs to be initiated in the computer resource service. Additionally, for example, the performance metrics can be utilized to balance the MIs currently hosted in the computer resource service 102. For instance, if a particular computer system shows poor performance metrics for the test VMs, one or more MIs hosted by the particular computer system can be migrated to a different computer system that shows better performance metrics.

After 216, the process can end, repeat, or return to any point.

Figure 3A:
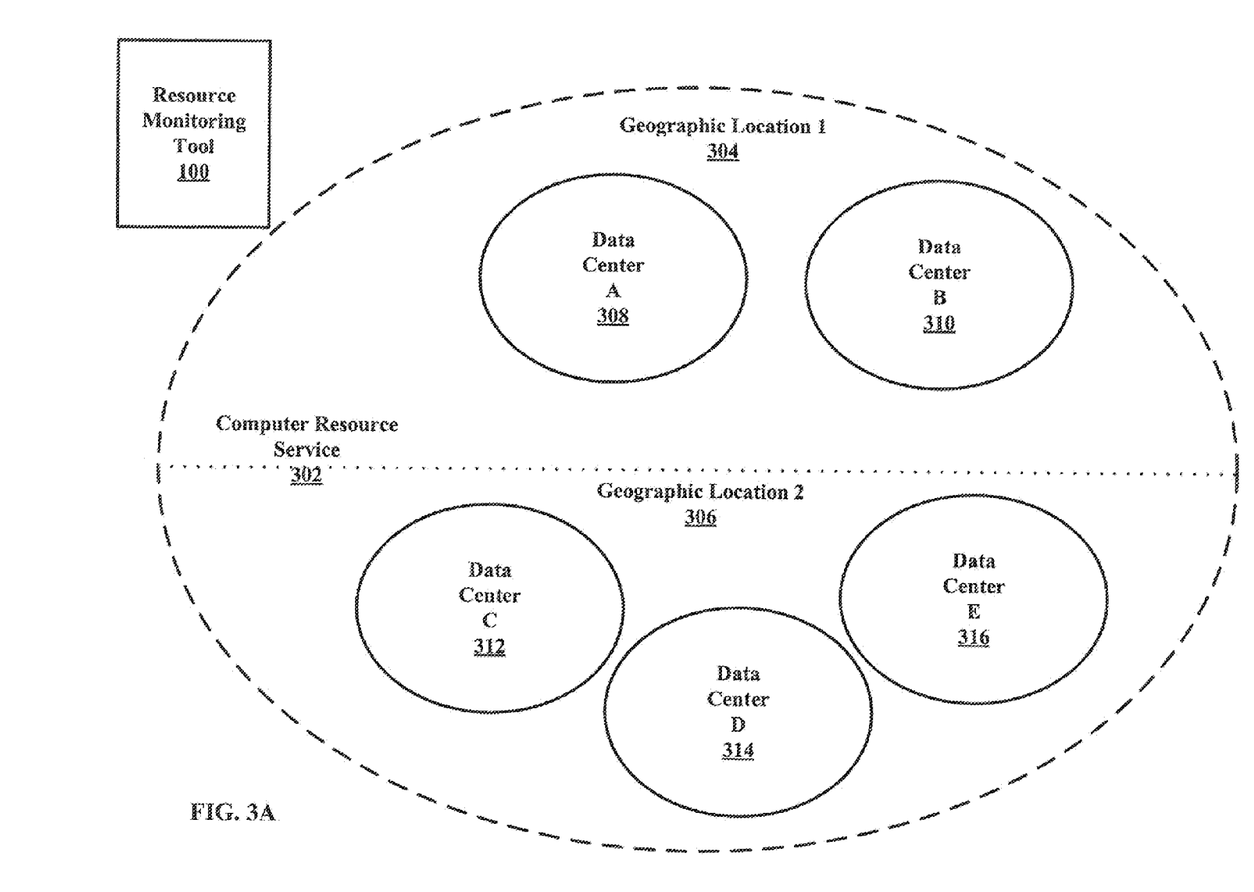
FIGS. 3A and 3B illustrate another example of an environment in which a resource monitoring tool can monitor a computer resource service, according to various implementations.
Figure 3B:
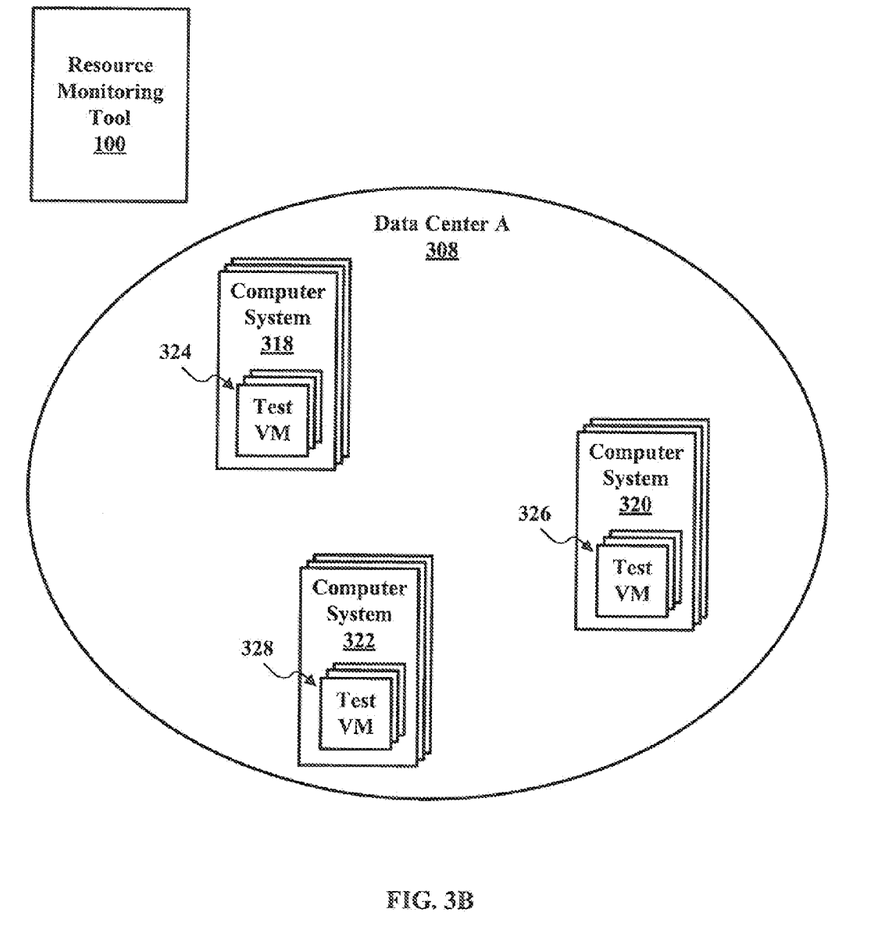

FIGS. 3A and 3B illustrate another example of the resource monitoring tool 100 which can determine and monitor the performance a computer resource service 302, according to various implementations. While FIGS. 3A and 3B illustrate various components contained in the resource monitoring tool 100, FIGS. 3A and 3B illustrate one example of a monitoring tool and additional components can be added and existing components can be removed. Likewise, while FIGS. 3A and 3B illustrate various components contained in the computer resource service 302, FIGS. 3A and 3B illustrate illustrates one example of a computer resource service and additional component can be added and existing components can be removed.

In implementations, the computer resource service 302 can provide computing resources as a service to users that are located in regionally and geographically distinct locations. In provide services to the regionally and geographically distinct locations, the computer systems of the computer resource service 302 can be dispersed among the various geographic locations and regional locations. As illustrated in FIG. 3A, the computer resource service 302 can be divided into several geographic locations or regions, for example, geographic location 1 304 and geographic location 2 306. That is, the various computer systems supporting the computer resource service 302 can be located in different geographic locations to support computer resources offered in the different geographic locations.

For example, the computer resource service 302 can include a number of data centers, for example, a data center A 308, a data center B 310, a data center C 312, a data center D 314, and a data center E 316. As illustrated in FIG. 3A, the data center A 308 and the data center B 310 can be located in the geographic location 1 304. The data center C 312, data center D 314, and the data center E 316 can be located in the geographic location 2 306. The data centers within a particular geographic location can also be dispersed in sub-regions of the particular geographic location.

As illustrated in FIG. 3B, the data center A can include a number of computer systems, such as computer systems 318, computer systems 320, and computer systems 322. Likewise, the data center B 310, the data center C 312, the data center D 314, and the data center E 316 can include a number of computer systems. To determine and monitor the performance of the data, the resource monitoring tool 100 can be configured to initiate test VMs 324, 326, and 328 on the computer systems 318, computer systems 320 and computer systems 322, respectively. As described below, the resource monitoring tool 100 can be configured to select the computer systems so as to accurately represent the computer resources of the data center A 308 of the computer resource service 302.

When determining where to host MIs in the computer resource service 302, the computer resource service 302 can desire to determine the performance of the computer systems across all the geographic and regional locations. Likewise, when utilizing the computer resource service 302, users can desire to determine the computer systems that will provide computing resources that best fits the users' needs. For example, users can desire to determine the performance of computer systems within their geographic location as well as computer systems in other geographic locations. Accordingly, the resource monitoring tool 100 can monitor and determine the performance metrics that are representative of the locations of the computer system and the configurations of the computer systems.

In implementations, the process 200 described above can be utilized to report the performance metrics of the computer resource service 302. For example, the filters utilized in requested the set of performance metrics can be tailored for the computer resource service 302. For instance, the filters can include a filter for the geographic location of the computer resource service 302 (e.g., geographic location 1

304 and geographic location 2 306). Also, the filters can include a filter for the data centers of the computer resource service 302 (e.g., a data center A 308, a data center B 310, a data center C 312, a data center D 314, and a data center E 316).

In addition, the filters can include filters around the specific computer systems of the computer resource service 302 (e.g., computer systems 318, computer systems 320, and computer systems 322 of the data center A 308.) These filters can include one or more parameters associated with the configurations of the computer systems. Likewise, these filters can include one or more parameters associated with the test VMs (e.g., test VMs 324, 326, and 328) such as configurations of the test VMs, benchmark tests performed by the test VMs, and the like.

The user device 120 can utilize the performance metrics to assist in any process that requires determination of the performance of the computer resources of the computer resource service 302.

Figure 4:
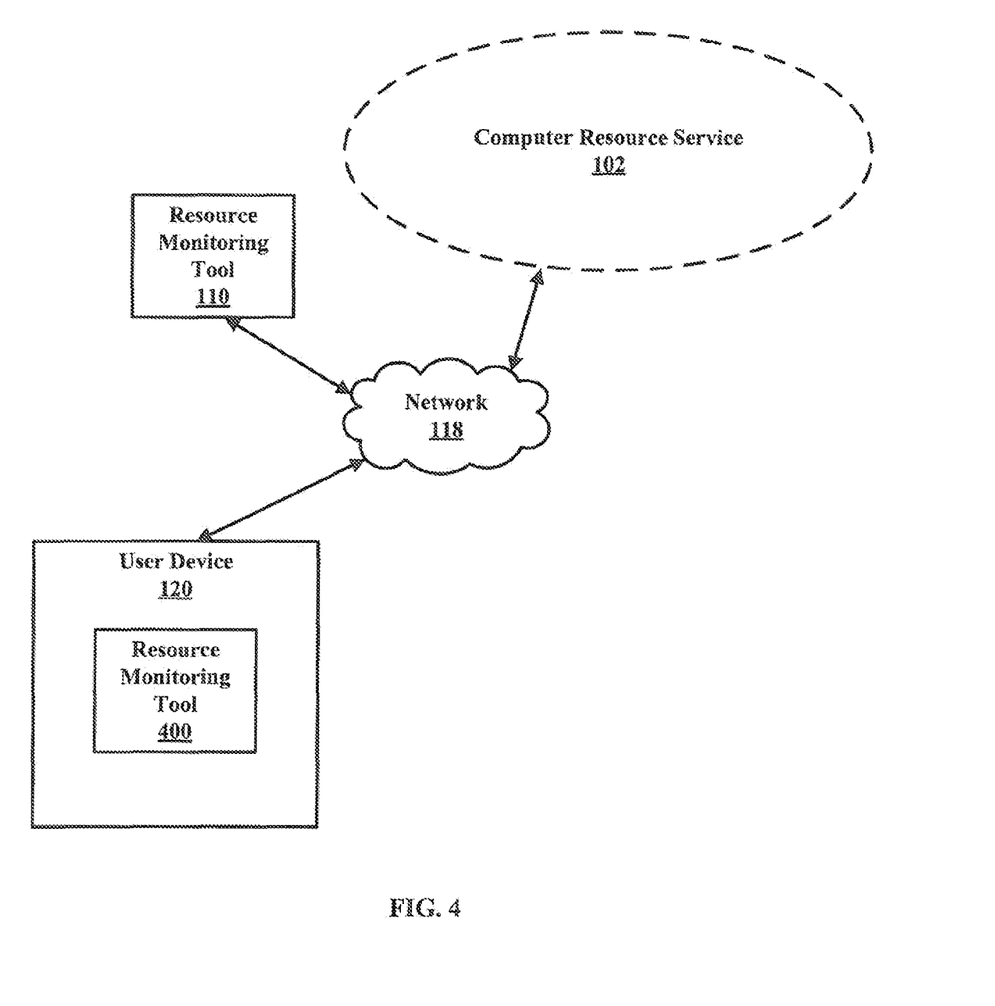
FIG. 4 illustrates another example of an environment in which a resource monitoring tool can monitor a computer resource service, according to various implementations.

FIG. 4 illustrates another example of the resource monitoring tool 100 which can determine and monitor the performance the computer resource service 102 and provide performance data to users, according to various implementations. While FIG. 4 illustrates various components contained in the resource monitoring tool 100, FIG. 4 illustrates one example of a monitoring tool and additional components can be added and existing components can be removed. Likewise, while FIG. 4 illustrates various components contained in the user device 102, FIG. 4 illustrates one example of a user device and additional component can be added and existing components can be removed.

As described above, the resource monitoring tool 100 can be located with the computer resource service 102 or on an external computer system to monitor the performance of the computer resource service 102. In implementations, a copy 400 of the resource monitoring tool 100 can be located on the user device 102. The user device 102 can utilize the copy 400 of the resource monitoring tool 100 to monitor the performance and determine the set of performance metrics as described above.

In implementation, the copy 400 of the resource monitoring tool 100 can be configured to output a user interface (e.g., a graphic user interface or command line interface). A user of the copy 400 of the resource monitoring tool 100 can utilize the user interface to control the copy 400 of the resource monitoring tool 100. For example, the filters can be input via the user interface and the set of performance metrics can be output via the user interface.

Figure 5:
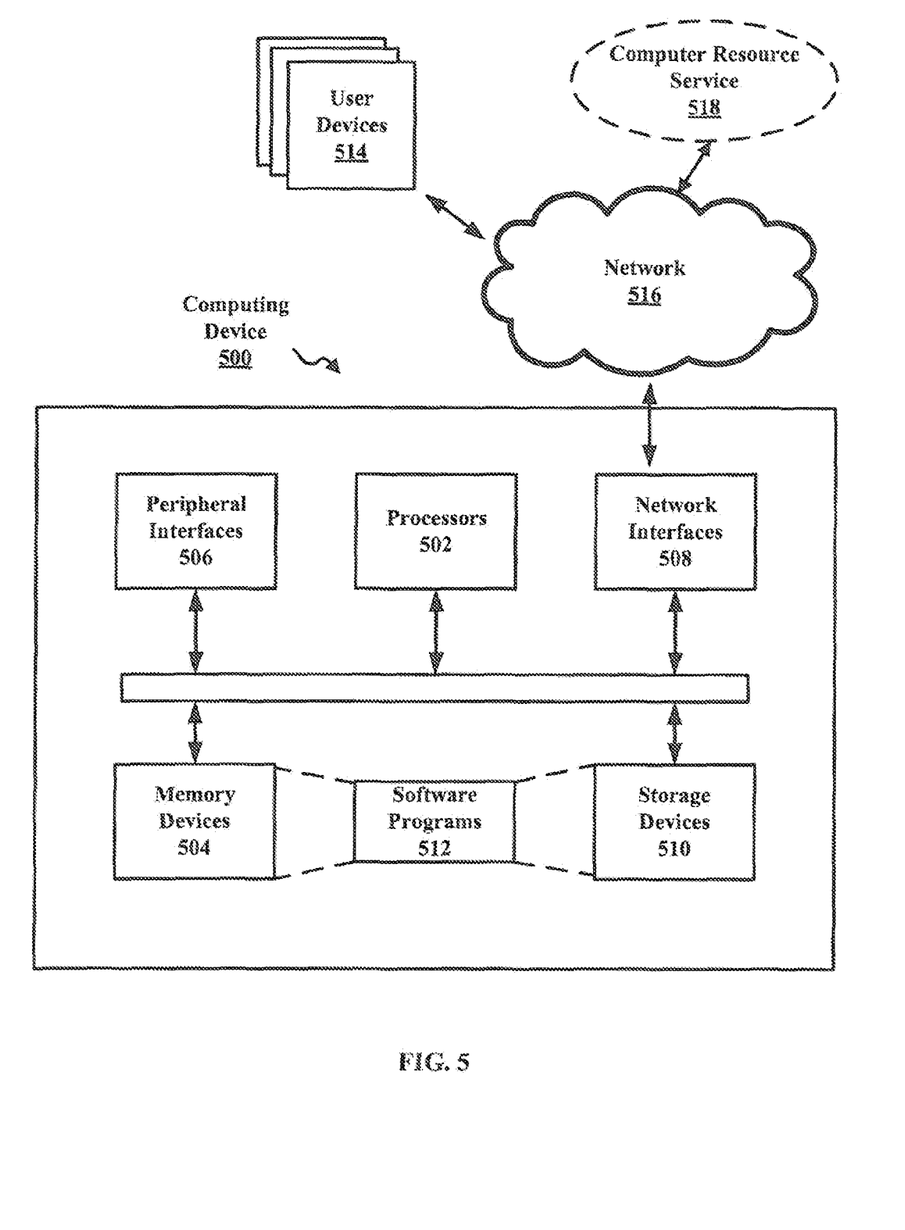
FIG. 5 illustrates an example of a hardware configuration of a computer device, according to various implementations.

FIG. 5 illustrates an example of a hardware configuration for a computing device 500 implementing the resource monitoring tool 100 that can be used to perform one or more of the processes described above. While FIG. 5 illustrates various components contained in the computing device 500, FIG. 5 illustrates one example of a computing device and additional components can be added and existing components can be removed.

As illustrated in FIG. 5, the computing device 500 can include one or more processors 502 of varying core configurations and clock frequencies. The computing device 500 can also include one or more memory devices 504 that serve as a main memory during the operation of the computing device 500. For example, during operation, a copy of the resource monitoring tool 100 can be stored in the one or more memory devices 504. The computing device 500 can also include one or more peripheral interfaces 506, such as keyboards, mice, touchpads, computer screens, touch-screens, etc., for enabling human interaction with and manipulation of the computing device 500.

The computing device 500 can also include one or more network interfaces 508 for communicating via one or more networks, such as Ethernet adapters, wireless transceivers, or serial network components, for communicating over wired or wireless media using protocols. The computing device 500 can also include one or more storage device 510 of varying physical dimensions and storage capacities, such as flash drives, hard drives, random access memory, etc., for storing data, such as images, files, and program instructions for execution by the one or more processors 502.

Additionally, the computing device 500 can include one or more software programs 512, such as the resource monitoring tool 100. The one or more software programs 512 can include instructions that cause the one or more processors 502 to perform the processes described herein. Copies of the one or more software programs 512 can be stored in the one or more memory devices 504 and/or on in the one or more storage devices 510. Likewise, the data, for example, the performance data store 114, utilized by one or more software programs 512 can be stored in the one or more memory devices 504 and/or on in the one or more storage devices 510.

In implementations, the computing device 500 can communicate with one or more remote user devices 514 and the computer resource service 518 via a network 516. The one or more remote user devices 514 can be any types of conventional computing devices. For example, the one or more user devices 514 can include desktops, laptops, servers, etc., or mobile devices, such as smart telephones, tablet computers, cellular telephones, personal digital assistants, etc. The network 516 can be any type of network, such as a local area network, a wide-area network, a virtual private network, the Internet, an intranet, an extranet, a public switched telephone network, an infrared network, a wireless network, and any combination thereof. The network 516 can support communications using any of a variety of commercially-available protocols, such as TCP/IP, OSI, FTP, UPnP, NFS, CIFS, and AppleTalk. The network 516 can be, for example, a local area network, a wide-area network, a virtual private network, the Internet, an intranet, an extranet, a public switched telephone network, an infrared network, a wireless network, and any combination thereof.

In implementations, the computing device 500 can exchange data with the one or more user devices 514 and the computer resource service 518 over the network 516. For example, the computing device 500 can receive requests for the one or more of the performance metrics from the one or more user devices 514.

The computing device 500 and the resource monitoring tool 100 can be implemented as part of at least one service or Web service, such as may be part of a service-oriented architecture. As described above, the resource monitoring tool 100 can implement an interface, for example, a Web Services API. The computing device 600 can exchange data with the one or more user devices 514, via the Web Services API, during operation of the at least one service or Web service. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

In implementations the computing device 500 can be utilized as part of a Web server architecture. In the Web server architecture, the computing device 500 can run any of a variety of server or mid-tier applications, including HTTP servers, FTP servers, CGI servers, data servers, Java servers, and business application servers. The computing device 500 also can be capable of executing programs or scripts in response requests from the one or more remote user devices 514, such as by executing one or more Web applications that may be implemented as one or more scripts or programs written in any programming language, such as Java®, C, C# or C++, or any scripting language, such as Perl, Python, or TCL, as well as combinations thereof. The computing device 500 can also include database servers, including without limitation those commercially available from Oracle®, Microsoft®, Sybase®, and IBM®.

The computing device 500 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computing device 500 as described above need not be enclosed within a single enclosure or even located in close proximity to one another. Those skilled in the art will appreciate that the above-described componentry are examples only, as the computing device 500 can include any type of hardware componentry, including any necessary accompanying firmware or software, for performing the disclosed implementations. The computing device 500 can also be implemented in part or in whole by electronic circuit components or processors, such as application-specific integrated circuits (ASICs) or field-programmable gate arrays (FPGAs).

Certain implementations described above can be performed as a computer applications or programs. The computer program can exist in a variety of forms both active and inactive. For example, the computer program can exist as one or more software programs, software modules, or both that can be comprised of program instructions in source code, object code, executable code or other formats; firmware program(s); or hardware description language (HDL) files. Any of the above can be embodied on a computer readable medium, which include non-transitory computer readable storage devices and media, and signals, in compressed or uncompressed form. Examples of non-transitory computer readable storage devices and media include conventional computer system RAM (random access memory), ROM (read-only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection may be through a direct connection, or through an indirect connection via other devices, components, and connections.

For simplicity and illustrative purposes, the principles of the present teachings are described above by referring mainly to examples of various implementations thereof. However, one of ordinary skill in the art would readily recognize that the same principles are equally applicable to, and can be implemented in, many different types of information and systems, and that any such variations do not depart from the true spirit and scope of the present teachings. Moreover, in the preceding detailed description, references are made to the accompanying figures, which illustrate specific examples of various implementations. Electrical, mechanical, logical and structural changes can be made to the examples of the various implementations without departing from the spirit and scope of the present teachings. The preceding detailed description is, therefore, not to be taken in a limiting sense and the scope of the present teachings is defined by the appended claims and their equivalents.

What is claimed is:

1. A non-transitory computer readable storage medium storing instructions for causing one or more processors to perform a method for assessing performance of a computer resource service, the method comprising:

sending, via a network to a system monitoring performance of the computer resource service, a request for performance metrics of particular configurations of computer systems from among a plurality of configurations of computer systems of the computer resource service, wherein the system monitoring performance uses test virtual machines on different ones of the computer systems to collect performance metrics for the plurality of configurations, wherein the request specifies filters that comprises one or more parameters that identify the particular configurations of computer systems;

receiving, via the network from the system monitoring performance, a response that includes a set of the performance metrics specified by the one or more filters in the request, wherein the set of performance metrics comprises performance metrics for different ones of the configurations of the computer systems;

selecting, based at least in part on the set of performance metrics received, a configuration from among the configurations of the computer systems of the computer resource service; and sending a request to initiate a new virtual machine in the computer resource service according to the selected configuration.

2. The non-transitory computer readable storage medium of claim 1, wherein the one or more parameters comprise at least one of a location the computer systems of the computer resource service, a configuration of the computer systems of the computer resource service, the configurations of the test virtual machines, a benchmark test performed by the test virtual machines, a type of performance metric, a date, a time, or a statistical value associated with the performance metrics.

3. The non-transitory computer readable storage medium of claim 1, wherein selecting the configuration from the configurations of the test virtual machines, comprises:
determining a desired performance of the virtual machine;
comparing the desired performance to the set of performance metrics; and
determining, based at least in part on the comparison, the configuration of the test virtual machine.

4. The non-transitory computer readable storage medium of claim 1, the method further comprising:
determining, based at least in part on the set of performance metrics, at least one computer system from the computer systems on which to initiate the virtual machine.

5. The non-transitory computer readable storage medium of claim 1, the method further comprising:
determining, based at least in part on the set of performance metrics, at least one location of the computer systems where to initiate the virtual machine.

6. A computer-implemented method for assessing performance of a computer resource service, the method comprising:
providing, by the computer resource service, a plurality of different configurations of computer systems;
receiving, via a network interface, a request for performance metrics of particular ones of the plurality of different configurations of the computer systems, wherein the request specifies one or more parameters that identify the particular ones of the configurations;
determining, based at least in part on the one or more parameters specified in the request, a set of the performance metrics of particular ones of the computer systems, wherein the set of the performance metrics are representative of at least one of a location distribution of computer systems in the computer resource service and a difference in the computer resources of the computer systems, and wherein the set of performance metrics is configured for use by a system that is assessing the performance of the computer resource service to select at least one computer system on which to request to initiate at least one new virtual machine; and
sending, via the network interface, a response that includes the determined set of the performance metrics.

7. The computer-implemented method of claim 6, the method further comprising:
determining the performance metrics from test virtual machines executing on the computer systems of the computer resource service.

8. The computer-implemented method of claim 6, the method further comprising:
receiving, in response to sending the response, a request to initiate at least one virtual machine on at least one computer system associated with the set of performance metrics.

9. The computer-implemented method of claim 6, wherein the network interface is a web service interface.

10. The computer-implemented method of claim 6, wherein the one or more parameters comprise at least one of a location the computer systems of the computer resource service, a configuration of the computer systems of the computer resource service, the configurations of the test virtual machines, a benchmark test performed by the test virtual machines, a type of performance metric, a date, a time, or a statistical value associated with the performance metrics.

11. A computer-implemented method for assessing performance of a computer resource service, the method comprising:
sending, via a network interface to a system monitoring performance of the computer resource service, a request for performance metrics of particular configurations of computer systems from among a plurality of configurations of computer systems of the computer resource service, wherein the system monitoring performance uses test virtual machines on different ones of the computer systems to collect performance metrics for the plurality of configurations, and wherein the request specifies one or more parameters that identify the particular configurations of computer systems;
receiving, from the system monitoring performance, a set of the performance metrics specified by the one or more parameters in the request, wherein the set of the performance metrics are representative of at least one of a location distribution of computer systems in the computer resource service and a difference in the computer resources of the computer systems, and wherein the set of performance metrics is configured for use by a system that is assessing the performance of the computer resource service to select at least one computer system on which to request to initiate at least one new virtual machine; and
performing, based at least in part on the set of performance metrics, an action associated with the computer resource service.

12. The computer-implemented method of claim 11, wherein performing the action comprises:
determining first computer systems and second computer systems among the computer systems of the computer resource service, wherein the first computer systems are located at a first location and the second computer systems are located at a second location;
determining, based at least in part on the set of performance metrics, that the first computer systems are operating at a desired performance; and
initiating at least one virtual machine on at least one of the first computer systems.

13. The computer-implemented method of claim 11, wherein performing the action comprises:
determining first computer systems and second computer systems among the computer systems of the computer resource service, wherein the first computer systems include a first configuration and the second computer systems include a second configuration;
determining, based at least in part on the set of performance metrics, that the first computer systems are operating at a desired performance; and initiating at least one virtual machine on at least one of the first computer systems.

14. The computer-implemented method of claim 11, wherein performing the action comprises:
   determining a first configuration of the test virtual machines and a second configuration of the test virtual machines;
   determining, based at least in part on the set of performance metrics, that the first configuration is operating at a desired performance; and
   initiating, according to the first configuration, at least one virtual machine on the computer systems.

15. The computer-implemented method of claim 11, wherein performing the action comprises:
   determining, based at least in part on the set of the performance metrics, one of the computer systems that has available computer resources; and
   migrating an existing virtual machine to the one of the computer systems.

16. A system for assessing performance of a computer resource service, the system comprising:
   at least one memory device comprising instructions;
   a display device; and
   at least one processor coupled at least one memory device and the display device and configured to execute the instructions to perform a method comprising:
      sending, via a network interface to a system monitoring performance of the computer resource service, a request for performance metrics of particular configurations of computer systems from among a plurality of configurations of computer systems of the computer resource service, wherein the system monitoring performance uses test virtual machines on different ones of the computer systems to collect performance metrics for the plurality of configurations, and wherein the request specifies one or more parameters that identify the particular configurations of computer systems;
      receiving, from the system monitoring performance, a response that includes a set of the performance metrics specified by the one or more parameters in the request, wherein the set of performance metrics is configured for use by the system to select at least one computer system from among the computer systems of the computer resource service on which to request to initiate at least one new virtual machine; and
      outputting, via the display device, a portion of the set of performance metrics.

17. The system of claim 16, the system further comprising:
   an input device coupled to the at least one processor, wherein the input device receives the one or more parameters.

18. The system of claim 16, the system further comprising:
   a network device configured to communicate with a system that is monitoring the performance metrics, wherein the request is sent, via a web services protocol, to the system.

19. The system of claim 16, the system further comprising:
   a network device configured to communicate computer systems of the computer resource service, wherein the at least one processor is configured to monitor the performance metrics.

20. The system of claim 16, the system further comprising:
   a network device configured to communicate computer systems of the computer resource service, wherein the at least one processor is configured to communicate with a monitoring agent and collect, via the network device, a portion of the performance metrics from the monitoring agent.

21. The system of claim 16, wherein the at least one processor is configured to execute the instructions to perform the method further comprising:
   determining a first configuration of the test virtual machines and a second configuration of the test virtual machines;
   determining, based at least in part on the set of performance metrics, that the first configuration is operating at a desired performance; and
   initiating, according to the first configuration, at least one virtual machine on the computer systems.

* * * * *